United States Patent
Colas et al.

(10) Patent No.: US 10,514,688 B2
(45) Date of Patent: Dec. 24, 2019

(54) STATE CONTROLLER FOR A SYSTEM DRIVEN BY A COMMAND

(71) Applicant: SAFRAN AIRCRAFT ENGINES, Paris (FR)

(72) Inventors: Stephane Fernand Guy Colas, Les Andelys (FR); Serge Le Gonidec, Vernon (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 273 days.

(21) Appl. No.: 15/523,976

(22) PCT Filed: Nov. 4, 2015

(86) PCT No.: PCT/FR2015/052973
§ 371 (c)(1),
(2) Date: May 3, 2017

(87) PCT Pub. No.: WO2016/071630
PCT Pub. Date: May 12, 2016

(65) Prior Publication Data
US 2017/0371327 A1    Dec. 28, 2017

(30) Foreign Application Priority Data
Nov. 5, 2014  (FR) ..................... 14 60664

(51) Int. Cl.
*G05B 23/02* (2006.01)
*G06F 9/44* (2018.01)
*G06F 9/448* (2018.01)

(52) U.S. Cl.
CPC ..... *G05B 23/0205* (2013.01); *G05B 23/0202* (2013.01); *G06F 9/4498* (2018.02)

(58) Field of Classification Search
CPC ............ G05B 23/0205; G05B 23/0202; G05B 23/0227; G05B 13/026; G05B 13/042; G05B 13/048; G06F 9/4498
See application file for complete search history.

(56) References Cited

U.S. PATENT DOCUMENTS 6,643,554 B2    11/2003  Gough, Jr. et al.
7,689,296 B2    3/2010   Backstrom et al.
(Continued)

FOREIGN PATENT DOCUMENTS

RU    114 186 U1    3/2012
RU    2 477 515 C2  3/2013

OTHER PUBLICATIONS

International Search Report dated Feb. 24, 2016 in PCT/FR2015/052973 filed Nov. 4, 2015.
(Continued)

*Primary Examiner* — Manuel L Barbee
(74) *Attorney, Agent, or Firm* — Oblon, McClelland, Maier & Neustadt, L.L.P.

(57) ABSTRACT

A state monitor for monitoring the state of a system and including a calculator and a memory; the system being controlled by a command defining a plurality of modes of operation of the system, each mode of operation corresponding to applying a command of constant value; the memory containing a set of stored state matrices representing, for each mode of operation of the system, the value of the projection of its state in time; and the calculator being configured, during operation of the system, to determine estimated values for the state of the system at a given instant with the state functions and of its state at an earlier instant.

8 Claims, 1 Drawing Sheet

(56) References Cited

U.S. PATENT DOCUMENTS

| | | |
|---|---|---|
| 7,987,145 B2 | 7/2011 | Baramov |
| 2003/0028263 A1 | 2/2003 | Gordon Gough, Jr. et al. |
| 2006/0203930 A1* | 9/2006 | Hu ..................... G06F 11/3476 |
| | | 375/295 |
| 2007/0030596 A1* | 2/2007 | Tsukamoto ......... B41F 33/0009 |
| | | 360/135 |
| 2007/0255446 A1 | 11/2007 | Backstrom et al. |
| 2008/0052040 A1* | 2/2008 | Renner ................ G05B 19/406 |
| | | 702/182 |
| 2009/0240480 A1 | 9/2009 | Baramov |

OTHER PUBLICATIONS

Combined Russian Office Action and Search Report dated May 7, 2019 in corresponding Russian Patent Application No. 2017119213 (with English Translation of Category of Cited Documents), 5 pages.

\* cited by examiner

STATE CONTROLLER FOR A SYSTEM DRIVEN BY A COMMAND

GENERAL TECHNICAL FIELD

The present invention relates to the field of estimators for estimating the state of a system, and it finds a particular application for monitoring the state of a system in a space vehicle or in the field of aviation.

STATE OF THE ART

While a system is in operation, the states of various members such as valves are monitored continuously, with these members commonly playing a major role in the operation of the system.

In order to detect a failure, certain strategies make use of two independent measurements that are taken and compared. If those measurements differ by more than a predefined threshold, then an anomaly of the monitored system has been detected.

It is then necessary to determine which of the two measurements is correct and which is faulty. However, in numerous applications, and in particular in space or aviation applications, it is not possible to envisage stopping the system for maintenance.

A model is thus used in order to form a reference value, which thus makes it possible to distinguish between two different measurements and to identify the correct measurement and the erroneous measurement. The solutions in conventional use consist in estimating a linear model by digitally integrating a state model with a real time step size that is constant.

Nevertheless, obtaining high accuracy requires a very large number of calculations.

By way of example, when considering monitoring the state of a valve having a mean speed of 100 degrees per second (°/s), obtaining accuracy of 0.1° requires an integration step size of 1 millisecond (ms). Under such circumstances, obtaining such accuracy then imposes clocking at a rate of 1 ms, or imposes calculation with an integration loop time of 1 ms. The number of calculations is thus too great, given limited digital resources.

SUMMARY OF THE INVENTION

In order to respond at least in part to these various problems, the present invention proposes a state monitor for monitoring the state of a system, the monitor comprising a calculator and a memory;
the system being controlled by a command defining a plurality of modes of operation of the system, each mode of operation corresponding to applying a command value;
the memory containing a set of stored state matrices representing, for each mode of operation of the linear system, the value of its state in time on condition that the command is constant for a given space of time; and
the calculator being configured, during operation of the system, to determine estimated values for the state of the system at a given instant by means of the state matrices in memory and of the state of the system at an earlier instant.

Each mode of operation typically corresponds to applying a command of constant value to the system, and makes it possible to reduce significantly the cost of calculation.

For each mode of operation of the system, a number N of unit durations Ti are advantageously determined such that, for the system under consideration, each operating duration Tf in a given mode of operation can be decomposed as follows:

$$Tf = \sum_{i=0}^{N} ki * Ti$$

where ki are natural integers, each state function representing linear variation of the state of the system over a given unit duration Ti. Optionally, a step of smaller size Tj can be used to estimate the value with resolution Tj, with time being decomposed in such a manner that T=n*Ti+m*Tj with $\underline{n}$ and $\underline{m}$ being natural integers.

In a variant, for each mode of operation of the system, numbers N and M of unit durations Ti and Tj are determined such that, for the system under consideration, each operating duration Tf in a given mode of operation can be decomposed as follows:

$$Tf = \sum_{i=0}^{N} ki \times Ti + \sum_{j=0}^{M} kj \times Tj$$

where ki and kj are natural integers, each state function representing linear variation of the state of the system over a given unit duration Ti or Tj.

Said state functions are typically determined by means of a zero order method.

The calculator is typically configured to modify a parameter representative of the constant command applied to the system in order to model the variations of the system while it is in operation.

The invention also provides a method of monitoring the state of a system controlled by a command, wherein the following steps are performed:
defining a maximum number of modes of operation of the system in such a manner that, for each mode of operation, the system is subjected to a command of value that is constant;
determining a set of stored state functions representing, for each mode of operation of the system, its state for various time values corresponding to the applied command durations; and
storing the state functions in a memory in such a manner that, during operation of the system, estimated values for the state of the system at a given instant are determined by means of the state functions and of the state of the system at an earlier instant.

By way of example, each mode of operation corresponds to applying a command of constant value to the system.

For each mode of operation of the system, a number N of unit durations Ti are advantageously determined, optionally together with a number M of unit durations Tj of a size smaller than Ti, such that for the system under consideration, each operating duration Tf in a given mode of operation may be decomposed as follows:

$$Tf = \sum_{i=0}^{N} ki * Ti + \sum_{i=0}^{M} kj * Tj$$

where ki, kj are natural integers, each state function representing a value of the state of the linear system over a given duration N*Ti or M*Tj. M and N are limited values, the sum N*Ti+M*Tj serving to cover the durations of constant commands applied to the system.

In a variant, for each mode of operation of the system, numbers N and M of unit durations Ti and Tj are determined such that, for the system under consideration, each operating duration Tf in a given mode of operation can be decomposed as follows:

$$Tf = \sum_{i=0}^{N} ki \times Ti + \sum_{j=0}^{M} kj \times Tj$$

where ki and kj are natural integers, each state function representing linear variation of the state of the system over a given unit duration Ti or Tj.

By way of example, said state functions are determined by means of a zero order method.

The calculator is typically configured to modify a parameter representative of the constant command applied to the system in order to model the variations of the system while it is in operation.

SUMMARY OF THE FIGURES

Other characteristics, objects, and advantages of the invention appear from the following description, which is purely illustrative and nonlimiting, and which should be read with reference to the accompanying figures, in which.

DETAILED DESCRIPTION

Figure 1:
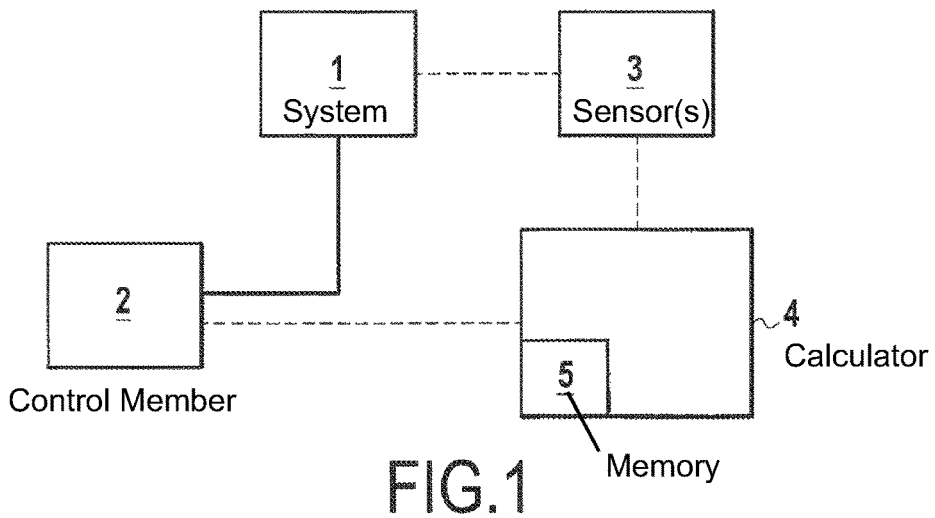
FIG. 1 is a diagram showing a state monitor in an aspect of the invention.
Figure 2:
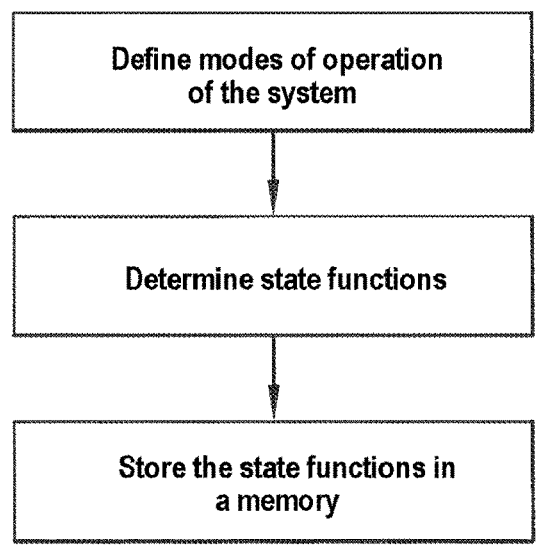
FIG. 2 is a diagram showing a process of preparing matrices for a monitor or a method in an aspect of the invention.

There follows a description of a system and a method in an aspect of the invention, given with reference to FIGS. 1 and 2, which are diagrams showing such a state monitor, and a process for preparing matrices for such a state monitor or for the method that is performed.

The state monitor as shown comprises a system 1 that is controlled by a control member 2 applying a command, one or more sensors 3 adapted to measure a state of the system 1, and a calculator 4 having a memory 5.

The system 1 under consideration may be of any type, for example it may be an engine rotor, an actuator, or any system, providing it operates under linear conditions, e.g. a system comprising one or more members.

The control member 2 controls the system 1 by applying a command, typically a step type command, i.e. a command that is constant over a given time interval.

In an application relating to validating measurements, the sensor 3 acquires one or more measurements of a state of the system 1, and then transmits these measurements to the calculator 4 so that it processes them. Taking a plurality of measurements in order to determine a single state serves to reduce inaccuracies, e.g. by taking the average between the various measurements.

The calculator 4 also determines an estimated state value, which is compared with the state values as measured by the sensor 3, in order to detect potential measurement errors or inconsistencies, and under such circumstances, the doubtful measurements are discarded, and the estimated state value is used instead of the measured state values.

This estimated state value is determined by means of state functions, e.g. functions determined in the form of state matrices that are stored in the memory 5.

These state functions are determined prior to operating the system 1, and they are constant while it is in operation.

The state functions are determined in such a manner that, for each mode of operation of the system 1, they represent the value of the projection in time of the state of the system 1.

The term a "mode of operation" of the system 1 is used to cover applying a command generated by the calculator 4 and applied by the control member 2, with a change in the mode of operation of the system 1 typically corresponding to a break in the applied command. The mode of operation of the system 1 may also correspond to the external constraints applied to the system 1.

Input parameters to the monitor are thus defined as the mode of operation, associated with the command amplitude and with the external constraints that are applied to the system 1.

By way of example, when considering a system 1 that is controlled by an on/off type command, three modes of operation may be considered for the system 1:
a first mode of operation in which the applied command is zero;
a second mode of operation in which the applied command is equal to a constant unit value 1; and
a third mode of operation in which the applied command is equal to a constant unit value −1.

Naturally, the number of modes of operation depends on the control member 2 and on the applied command.

Once the number of modes of operation of the system 1 has been determined, a set of state functions is determined for each mode of operation of the system 1, e.g. in the form of state matrices that represent the value of the projection in time of the state of the system 1 for a given mode of operation.

By way of example, for each mode of operation of the system 1, it is possible to determine a number N of unit durations Ti, such that each operating duration Tf in a given mode of operation may be decomposed as follows:

$$Tf = \sum_{i=0}^{N} ki * Ti$$

with ki being natural integers, each state function representing the value of the projection of the state of the system 1 onto a given unit duration Ti.

In order to improve accuracy, resolution can be increased by introducing unit durations Tj that are a submultiple of Ti.

For example, by setting durations Ti=10 ms and Tj=1 ms, for a step of 83 ms, it suffices to calculate the state value for 80 ms and then for 3 ms.

The state functions are advantageously determined by means of a zero order method, which makes it possible to obtain accuracy that is substantially equal to, or at least very close to, the accuracy of continuous integration methods, in particular for linear systems 1 controlled by means of a step type command.

During operation of the system 1, the calculator 4 then makes use of the state functions corresponding to the mode of operation of the system 1 in order to determine an estimate of the state of the system 1, the state functions being stored beforehand in the memory 5 and not being calculated while the system 1 is in operation.

The process for preparing matrices then takes place in three steps as shown in FIG. 2:
- a first step of defining the modes of operation of the system 1;
- a second step of determining state functions for the various modes of operation of the system 1; and
- a third step of storing state functions in a memory, specifically the memory 5 as shown in FIG. 1.

Thus, the calculator 4 can take account of the variations in the operation of the system 1 without needing to recalculate all or any of the state functions stored in the memory 5. On each calculation cycle, the calculator determines the estimated state value for the system 1 on the basis of the previous state value, of the applied command, and of the state functions corresponding to the mode of operation of the system, the state functions being stored in the memory 5 and remaining constant during operation of the system 1.

Figure 3:
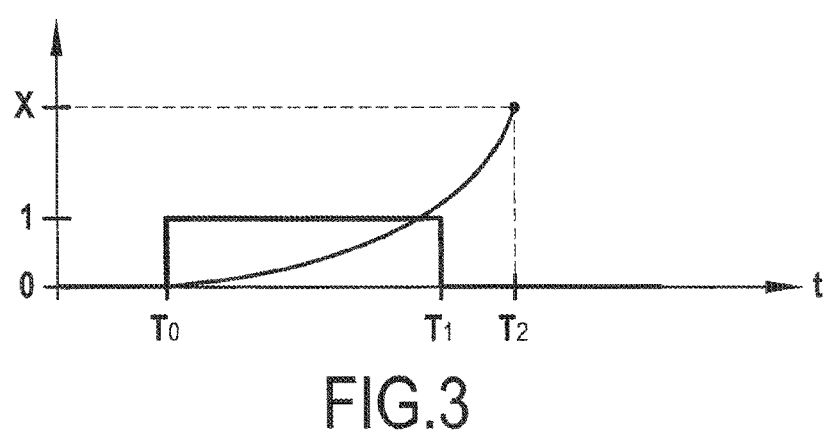
FIG. 3 shows diagrammatically an application example of a state monitor in an aspect of the invention.

FIG. 3 shows an example of estimating the state of a system.

This figure shows a command applied to a system over time, specifically a step type command that can take two values: 0 and 1.

This figure also shows the state X of the system as estimated at the instant T2 and its real variation as a function of time.

In the initial state, the applied command is zero, and the system is in a zero state; it remains in its initial state. The system is then in a first mode of operation, corresponding to the application of a zero command.

At an instant T0, a command equal to 1 is applied. The system is then in a second mode of operation. The calculator 4 then applies the state functions corresponding to this second mode of operation of the system, and the calculated state of the system therefore varies over time in application of its linear dynamic behavior.

The state of the system is calculated in successive steps, and not continuously, with the number of steps depending on the desired resolution and on the selected time base.

For example, considering orders having a maximum duration of 100 ms, the following are defined:
- a time base Ti=10 ms, and the estimation matrices for 10, 20, 30, 40, 50, 60, 70, 80, 90, and 100 milliseconds are stored in memory; and
- a time base Tj=1 ms, and the estimation matrices for 1, 2, 3, 4, 5, 6, 7, 8, and 9 milliseconds are stored in memory.

A command having a duration of 78 ms is thus calculated in two calculations using the 70 ms matrix (i=7) and the 8 ms matrix (j=8).

At an instant T1>T0, the command returns to 0. The system is then in a third mode of operation, corresponding to a zero command at the end of a movement. The state of the system thus varies, e.g. under the effect of the inertia of the system, to a value X at an instant T2>T1, at which the inertia no longer has any effect and where the system then returns to the first mode of operation.

By way of example, the previously-determined state functions for the operation of the system 1 as stored in the memory 5 can be used by a Kalman filter in order to calculate the variation in the state of the system 1 or for any other function calling on a state estimate, providing commands are given by constant segments applied to a system that is assumed to be linear.

The present invention thus makes it possible to reduce considerably the calculation power needed for determining the state of a system that is considered to be linear in its operating domain, while conserving accuracy that is close to or even identical to the accuracy of a system using continuous digital integration.

The invention claimed is:

1. An assembly comprising a system and a state monitor for monitoring the state of said system, said state monitor comprising a calculator and a memory;
   the system comprising a command configured to apply a command of constant value selected from a plurality of values, each value defining a mode of operation of the system;
   the memory containing a set of stored state matrices representing, for each mode of operation of the system, the value of the projection of its state in time; and
   the calculator being configured, during operation of the system, to determine estimated values for the state of the system at a given instant with state functions and of its state at an earlier instant,
   wherein for each mode of operation of the system, a number N of unit durations Ti is determined such that, for the system under consideration, each operating duration Tf in a given mode of operation can be decomposed as follows:

$$Tf = \sum_{i=0}^{N} ki * Ti$$

where ki is a natural integer, each state function representing linear variation of the state of the system over a given unit duration Ti.

2. An assembly according to claim 1, wherein each mode of operation corresponds to applying a command of constant value to the system.

3. An assembly according to claim 1, wherein said state functions are determined with a zero order method.

4. An assembly comprising a system and a state monitor for monitoring the state of said system, said state monitor comprising a calculator and a memory;
   the system comprising a command configured to apply a command of constant value selected from a plurality of values, each value defining a mode of operation of the system;
   the memory containing a set of stored state matrices representing, for each mode of operation of the system, the value of the projection of its state in time; and
   the calculator being configured, during operation of the system, to determine estimated values for the state of the system at a given instant with state functions and of its state at an earlier instant,
   wherein for each mode of operation of the system, numbers N and M of unit durations Ti and Tj are determined such that, for the system under consideration, each operating duration Tf in a given mode of operation can be decomposed as follows:

$$Tf = \sum_{i=0}^{N} ki \times Ti + \sum_{j=0}^{M} kj \times Tj$$

where ki and kj are natural integers, each state function representing linear variation of the state of the system over a given unit duration Ti or Tj.

5. A method of monitoring the state of a system controlled by a command, wherein the following steps are performed:
defining a maximum number of modes of operation of the system in such a manner that, for each mode of operation, the system is subjected to a command that is constant;
determining a set of stored state functions representing, for each mode of operation of the system, a value for the projection of its state in time; and
storing the state functions in a memory in such a manner that, during operation of the system, a calculator determines estimated values for the state of the system at a given instant with the state functions and of its state at an earlier instant
wherein for each mode of operation of the system, a number N of unit durations Ti is determined such that, for the system under consideration, each operating duration Tf in a given mode of operation can be decomposed as follows:

$$Tf = \sum_{i=0}^{N} ki * Ti$$

where ki is a natural integer, each state function representing linear variation of the state of the system over a given unit duration Ti.

6. A method according to claim 5, wherein each mode of operation corresponds to applying a command of constant value to the system.

7. A method according to claim 5, wherein said state functions are determined with a zero order method.

8. A method of monitoring the state of a system controlled by a command, wherein the following steps are performed:
defining a maximum number of modes of operation of the system in such a manner that, for each mode of operation, the system is subjected to a command that is constant;
determining a set of stored state functions representing, for each mode of operation of the system, a value for the projection of its state in time; and
storing the state functions in a memory in such a manner that, during operation of the system, a calculator determines estimated values for the state of the system at a given instant with the state functions and of its state at an earlier instant,
wherein for each mode of operation of the system, numbers N and M of unit durations Ti and Tj are determined such that, for the system under consideration, each operating duration Tf in a given mode of operation can be decomposed as follows:

$$Tf = \sum_{i=0}^{N} ki \times Ti + \sum_{j=0}^{M} kj \times Tj$$

where ki and kj are natural integers, each state function representing linear variation of the state of the system over a given unit duration Ti or Tj.

* * * * *